(12) United States Patent
Hita et al.

(10) Patent No.: US 12,360,534 B2
(45) Date of Patent: Jul. 15, 2025

(54) CONTROL SYSTEM OF DUMP TRUCK

(71) Applicant: HITACHI CONSTRUCTION MACHINERY CO., LTD., Tokyo (JP)

(72) Inventors: Masafumi Hita, Kashiwa (JP); Kouichi Shibata, Kasumigaura (JP); Shinichi Uotsu, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 149 days.

(21) Appl. No.: 17/910,930

(22) PCT Filed: Nov. 11, 2021

(86) PCT No.: PCT/JP2021/041606
§ 371 (c)(1),
(2) Date: Sep. 12, 2022

(87) PCT Pub. No.: WO2022/107682
PCT Pub. Date: May 27, 2022

(65) Prior Publication Data
US 2023/0161355 A1 May 25, 2023

(30) Foreign Application Priority Data
Nov. 17, 2020 (JP) .................................. 2020-191084

(51) Int. Cl.
*G05D 1/00* (2024.01)
(52) U.S. Cl.
CPC ......... *G05D 1/0225* (2013.01); *G05D 1/0214* (2013.01); *G05D 1/0238* (2013.01)
(58) Field of Classification Search
None
See application file for complete search history.

(56) References Cited

U.S. PATENT DOCUMENTS

| 2014/0146167 A1 | 5/2014 | Friend et al. |
| 2014/0261152 A1* | 9/2014 | Tanaka ................... E02F 9/265 |
| | | 116/230 |

(Continued)

FOREIGN PATENT DOCUMENTS

| JP | 2015-194933 A | 11/2015 |
| JP | 2018-142113 A | 9/2018 |

(Continued)

OTHER PUBLICATIONS

International Preliminary Report on Patentability received in corresponding International Application No. PCT/JP2021/041606 dated Jun. 1, 2023.

(Continued)

*Primary Examiner* — Lail A Kleinman
(74) *Attorney, Agent, or Firm* — MATTINGLY & MALUR, PC

(57) ABSTRACT

A controller that controls a dump truck in such a manner that the dump truck travels on a travelling route and stops at a loading specified position is provided in the dump truck. The controller computes, from travelling route data, a front-rear direction (a first stop direction) of the dump truck in a case in which the dump truck has travelled on the travelling route and stopped at the loading specified position, and corrects the travelling route to compute a post-correction travelling route including the loading specified position as an end point in such a manner that an excavator is located on an extension line of the front-rear direction (a second stop direction) of the dump truck in a case in which the dump truck has travelled on the post-correction travelling route and stopped at the loading specified position, on the basis of the computed first stop direction, position data of the loading specified position, and swing center position data of the excavator.

5 Claims, 11 Drawing Sheets

(56) References Cited

U.S. PATENT DOCUMENTS

| | | | |
|---|---|---|---|
| 2018/0284808 A1* | 10/2018 | Minagawa | G05D 1/0044 |
| 2019/0163192 A1* | 5/2019 | Takeda | B60P 1/04 |
| 2019/0367030 A1 | 12/2019 | Tanaka et al. | |
| 2020/0110417 A1* | 4/2020 | Utter | E02F 9/2045 |

FOREIGN PATENT DOCUMENTS

| | | |
|---|---|---|
| WO | 2013058247 A1 | 4/2013 |
| WO | 2014119711 A1 | 8/2014 |

OTHER PUBLICATIONS

International Search Report of PCT/JP2021/041606 dated Dec. 21, 2021.

Extended European Search Report received in corresponding European Application No. 21894556.6 dated Aug. 1, 2024.

* cited by examiner

CONTROL SYSTEM OF DUMP TRUCK

TECHNICAL FIELD

The present invention relates to a control system of a dump truck.

BACKGROUND ART

In mine operation in recent years, a request for operation of a dump truck of an autonomous travelling type (an autonomous travelling dump truck) that travels in an unmanned manner along a travelling route received via a satellite has been increasing for the purposes of reduction in labor cost and improvement in safety. As one of basic movements in a mine, there is loading work in which an excavator operated by an operator loads an autonomous travelling dump truck with a load. The excavator in the loading work exists on a platform called a face in many cases. Therefore, it is desirable for the autonomous travelling dump truck to come as close to this face as possible and stop, so that the excavator may easily carry out the loading work.

An autonomous travelling dump truck described in Patent Document 1 receives, by wireless communication, a route made toward a loading specified position specified by an operator (an excavator operator) of an excavator (a loading machine) in order to load the dump truck with a load and travels on the route. Further, Patent Document 1 proposes to compare the loading specified position with the position of a face detected by a rear-side recognizing device when the dump truck is to stop, and control the vehicle body to cause the dump truck to stop at a position closer to the excavator. By this control, the dump truck stops at a position that is as close to the loading specified position as possible, i.e., a position that allows the excavator operator to easily carry out loading work, without colliding with the face, and therefore, the loading work efficiency can improve.

PRIOR ART DOCUMENT

Patent Document

Patent Document 1: JP-2018-142113-A

SUMMARY OF THE INVENTION

Problem to be Solved by the Invention

There are various situations in a mine environment. Thus, a travelling route that allows the dump truck to stop at the loading specified position in a direction with which the excavator operator easily carries out loading cannot necessarily be made.

The autonomous travelling dump truck of Patent Document 1 can come as close to the loading specified position as possible and stop without colliding with a face. However, the direction of the dump truck (a vessel) at the stop position is not necessarily a direction with which loading is easy for the excavator operator. For example, in loading the vessel of a dump truck with a load by an excavator, it is general to align a front-rear direction (a longitudinal direction) of a front work device with a front-rear direction of the vessel and carry out dumping operation of a bucket while moving the front work device along the front-rear direction of the vessel to thereby carry out the loading in such a manner that the load does not concentrate on one place on the vessel. At this time, if the autonomous travelling dump truck stops in such a manner that the front-rear direction of the vessel intersects the front-rear direction of the front work device of the excavator, when it is attempted to move the front work device along the front-rear direction of the vessel, a swing movement also needs to be combined simultaneously with it, and there is a concern that a rise in difficulty of operation, fatigue of the excavator operator, an increase in cycle time, and so forth are caused.

Thus, when the loading specified position is specified, it is desirable to make a route in as parallel to the front-rear direction of the front work device as possible and cause the relation between the direction of the vehicle body (the front-rear direction) and the front-rear direction of the front work device to come close to parallel when the autonomous travelling dump truck stops. However, the environment around the loading field can change successively, and therefore, it is difficult for an upper-level map generation system (as a specific example, a server), which has a role of transmitting a map to autonomous travelling dump trucks, to set the travelling route of each autonomous travelling dump truck with changes in the surroundings of the loading field all recognized.

Therefore, in the case of attempting to stop the autonomous travelling dump truck in such a manner that the front-rear direction of the front work device of the excavator and the front-rear direction of the autonomous travelling dump truck come close to parallel as described above, the route needs to be adjusted according to the circumstances while the external world is recognized by the autonomous travelling dump truck itself.

Based on the above, the present invention intends to provide a control system of a dump truck of an autonomous travelling type that can stop at a loading specified position in a direction with which an operator of a loading machine easily carries out loading.

Means for Solving the Problem

The present application includes multiple means to solve the above-described problem. As one example thereof, there is provided a control system of a dump truck of an autonomous travelling type, the system including a controller that outputs a control signal to the dump truck to control the dump truck in such a manner that the dump truck travels on a travelling route and stops at a loading specified position, on a basis of data of the travelling route and position data of the dump truck, the traveling route including, as an end point of the travelling route, the loading specified position specified as a position at which a loading machine loads a vessel of the dump truck with a load. The controller is configured to compute a first stop direction on a basis of the data of the travelling route, the first stop direction being a front-rear direction of the dump truck when the dump truck has travelled on the travelling route and stopped at the loading specified position, and correct the travelling route to compute a post-correction travelling route that is a travelling route obtained by correcting the travelling route and includes the loading specified position as an end point, in such a manner that the loading machine is located on an extension line of a second stop direction that is the front-rear direction of the dump truck when the dump truck has travelled on the post-correction travelling route and stopped at the loading specified position, on a basis of the computed first stop direction, position data of the loading specified position, and position data of the loading machine.

Advantages of the Invention

According to the present invention, the dump truck of the autonomous travelling type can be stopped at the loading specified position in the direction with which an operator of the loading machine easily carries out loading.

MODE FOR CARRYING OUT THE INVENTION

An embodiment of the present invention will be described below by using the drawings.

Figure 1:
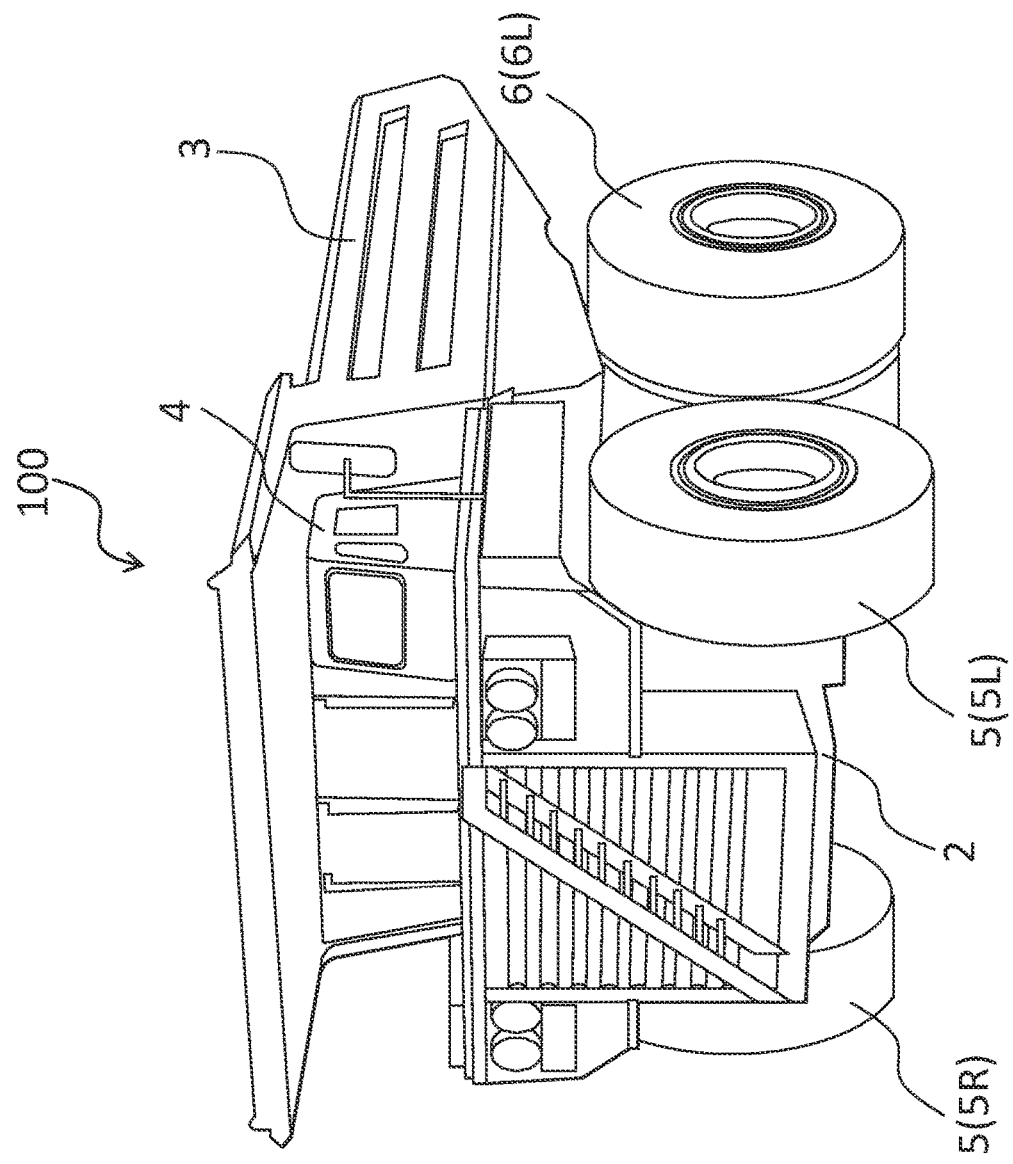
FIG. 1 is an appearance diagram of an autonomous travelling dump truck that is one example of a haulage vehicle according to an embodiment of the present invention.

FIG. 1 is an appearance diagram (a perspective view) of an autonomous travelling dump truck that is one example of a haulage vehicle according to the embodiment of the present invention. A dump truck 100 of FIG. 1 includes a vehicle body frame 2, a vessel (vessel) 3 pivotally supported on the vehicle body frame 2 by a support shaft (not illustrated), a cabin 4 attached to a front side on the vehicle body frame 2, multiple front wheels 5 attached to the front side of the vehicle body frame 2, and multiple rear wheels 6 attached to a rear side of the vehicle body frame 2.

The cabin 4 has a driver's seat (not illustrated) provided therein. An operator (a driver) sits on the driver's seat to carry out operation of a brake pedal, an accelerator pedal, and so forth out in some cases. That is, the dump truck 100 is subjected to manned manual operation in some cases. Onto the vessel 3, earth and sand that is a load (a hauled object) is loaded by a loading machine (a construction machine) such as a hydraulic excavator or a wheel loader. Further, at a hauling destination of the dump truck 100 (a dumping site), the load loaded on the vessel 3 can be discharged from a rear end of the vessel 3 by extending a vessel cylinder 15 (see FIG. 2) to raise a front end of the vessel 3 and incline the vessel 3 while causing the vessel 3 to pivot around the support shaft at the rear end of the vessel 3.

The front wheels 5 (5L, 5R) are rotatably provided on a lower side of a front part of the vehicle body frame 2. The front wheel 5L is disposed on a left side of the vehicle body frame 2, and the front wheel 6R is disposed on a right side of the vehicle body frame 2. The left and right front wheels 5L and 5R configure steering wheels a steering angle θ of which is changed by a steering device. The left and right front wheels 5L and 5R are subjected to steering operation by the steering device according to a rotation angle of a steering wheel of the dump truck 100.

The rear wheels 6 (6L, 6R) are rotatably provided on a rear part side of the vehicle body frame 2. The rear wheel 6L is disposed on the left side of the vehicle body frame 2, and the rear wheel 6R is disposed on the right side of the vehicle body frame 2. The left and right rear wheels 6L and 6R configure drive wheels of the dump truck 100 and are rotationally driven by left and right electrically driven travelling motors 19L and 19R (see FIG. 2). By rotationally driving the left and right rear wheels 6L and 6R, the dump truck 100 is driven to travel.

Major constituent elements such as the electrically driven motors 19 (see FIG. 2) that are accelerating-decelerating devices for controlling acceleration and deceleration of the rear wheels 6 and a suspension (a suspension device) that supports the front wheels 5 and the rear wheels 6 in a vertically movable manner are further mounted in the vehicle body frame 2, and a configuration that allows the vehicle to freely travel on a road surface with use of the front wheels 5 and the rear wheels 6 is adopted.

Figure 2:
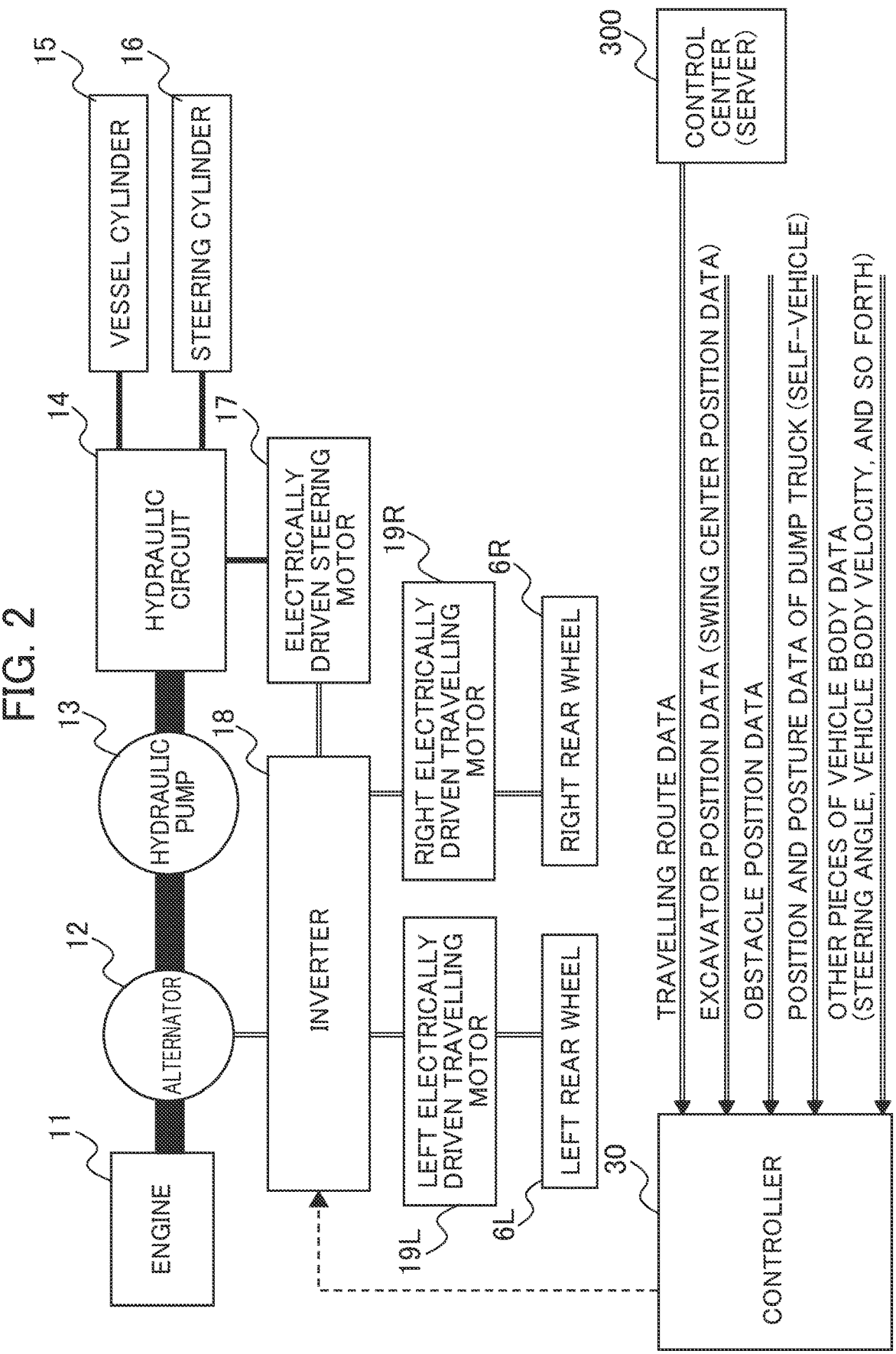
FIG. 2 is a schematic configuration diagram of a control system of the dump truck according to the embodiment of the present invention.

FIG. 2 is a schematic configuration diagram of a control system of a dump truck according to the embodiment of the present invention. The autonomous travelling dump truck 100 includes an engine 11, an alternator (an electric generator) 12 and a hydraulic pump 13 that are driven by the engine 11, a hydraulic circuit 14 that controls flow of a hydraulic operating fluid (a hydraulic fluid) supplied from the hydraulic pump 13 to respective hydraulic actuators (for example, a vessel cylinder 15, steering cylinders 16), the vessel cylinder 15 that raises or lowers the vessel 3 by extending or contracting through reception of supply of the hydraulic operating fluid from the hydraulic circuit 14, and an electrically driven steering motor 17 that inputs steering torque to a column shaft (not illustrated) coupled to the steering wheel (not illustrated) to actuate a steering valve (not illustrated). The autonomous travelling dump truck 100 also includes left and right steering cylinders 16 that change the steering angle of the left and right front wheels 5L and 5R by the hydraulic operating fluid supplied and discharged through the steering valve, the left and right electrically driven travelling motors 19 (19L, 19R) that apply torque to the left and right rear wheels 6 (6L, 6R) to control acceleration and deceleration of the dump truck 100, an inverter 18 that supplies power generated by the alternator 12 to the left and right electrically driven travelling motors 19, the electrically driven steering motor 17, and so forth on the basis of a control signal from a controller 30, and the controller 30 that outputs a control signal to the inverter 18 and so forth on the basis of various kinds of input information.

(Controller 30)

The controller (controller) 30 is a controller (for example, a microcomputer) including a computation processing device (for example, a processor such as a CPU), a storage device (for example, a semiconductor memory such as a ROM or a RAM), an input-output circuit, and a communication circuit and is configured to be capable of executing various kinds of processing prescribed by a program stored in the storage device by executing the program by the computation processing device. The controller 30 carries out control of the electrically driven travelling motors 19L and 19R and the electrically driven steering motor 17 (i.e., control of acceleration, deceleration, and steering of the dump truck 100) by outputting the control signal to the inverter 18 for execution of autonomous travelling of the dump truck 100, correction processing of the travelling route used when the dump truck 100 autonomously travels, and so forth.

The controller 30 is connected to a wireless device 83 (see FIG. 3) and is thus capable of executing wireless communication mutually with external terminals (for example, a server (a computer) 300 installed in a control center and a controller mounted in an excavator 200 (see FIG. 6)). The wireless device 83 transmits data output from the controller 30 from a wireless device antenna (not illustrated). Meanwhile, the wireless device 83 inputs data (for example, travelling route data to be described later) received by the wireless device antenna to the controller 30.

The following kinds of data are input to the controller 30: swing center position data that is position data of the excavator 200 as a loading machine, obstacle position data that is position data (obstacle coordinates) of an obstacle that is sensed by an obstacle sensor (for example, a LIDAR (see FIGS. 3, 4, and so forth)) 21 and is located in an advancing direction (a rear side) of the dump truck 100, position data of the dump truck (self-position data) computed by a GNSS receiver 84 mounted in the dump truck 100, posture data of the dump truck 100 (including orientation data of the dump truck) computed based on output of an IMU (not illustrated) and the GNSS receiver 84 mounted in the dump truck 100, steering angle data acquired by a steering angle sensor 81 mounted in the dump truck 100, velocity data acquired by a velocity sensor 82 mounted in the dump truck 100, and so forth.

The controller computes the drive torque of the left and right travelling motors 19 and the electrically driven steering motor 17 in such a manner as to cause the dump truck 100 to travel on the travelling route on the basis of travelling route data for the dump truck 100 wirelessly received from the server 300 in the control center, the position data (the swing center position data) of the excavator 200, the position data of an obstacle detected by the obstacle sensor 21 that senses an obstacle existing in the advancing direction of the dump truck 100, the position data of the dump truck 100 computed by the GNSS receiver 84, the posture data (the orientation data) of the dump truck 100 computed from a positioning result of the GNSS receiver 84 using multiple GNSS antennas (not illustrated), the travelling velocity of the dump truck 100 sensed by the velocity sensor 82, the steering angle of the front wheels 5 sensed by the steering angle sensor 81, and so forth, and controls the inverter 18 to cause the respective motors 17 and 19 to operate according to the computation result. Power generated by the alternator 12 is supplied to the respective motors 17 and 19 through the inverter 18, and the respective motors 17 and 19 carry out operation based on a command. The hydraulic fluid delivered from the hydraulic pump 13 is supplied to the vessel cylinder 15 and the steering cylinders 16 through the hydraulic circuit 14. In particular, a configuration is adopted in which steering of the front wheels 5 is carried out when the steering valve in the hydraulic circuit 14 is operated due to driving of the electrically driven steering motor 17 and a hydraulic line from the hydraulic pump 13 to the steering cylinders 16 is opened.

Figure 3:
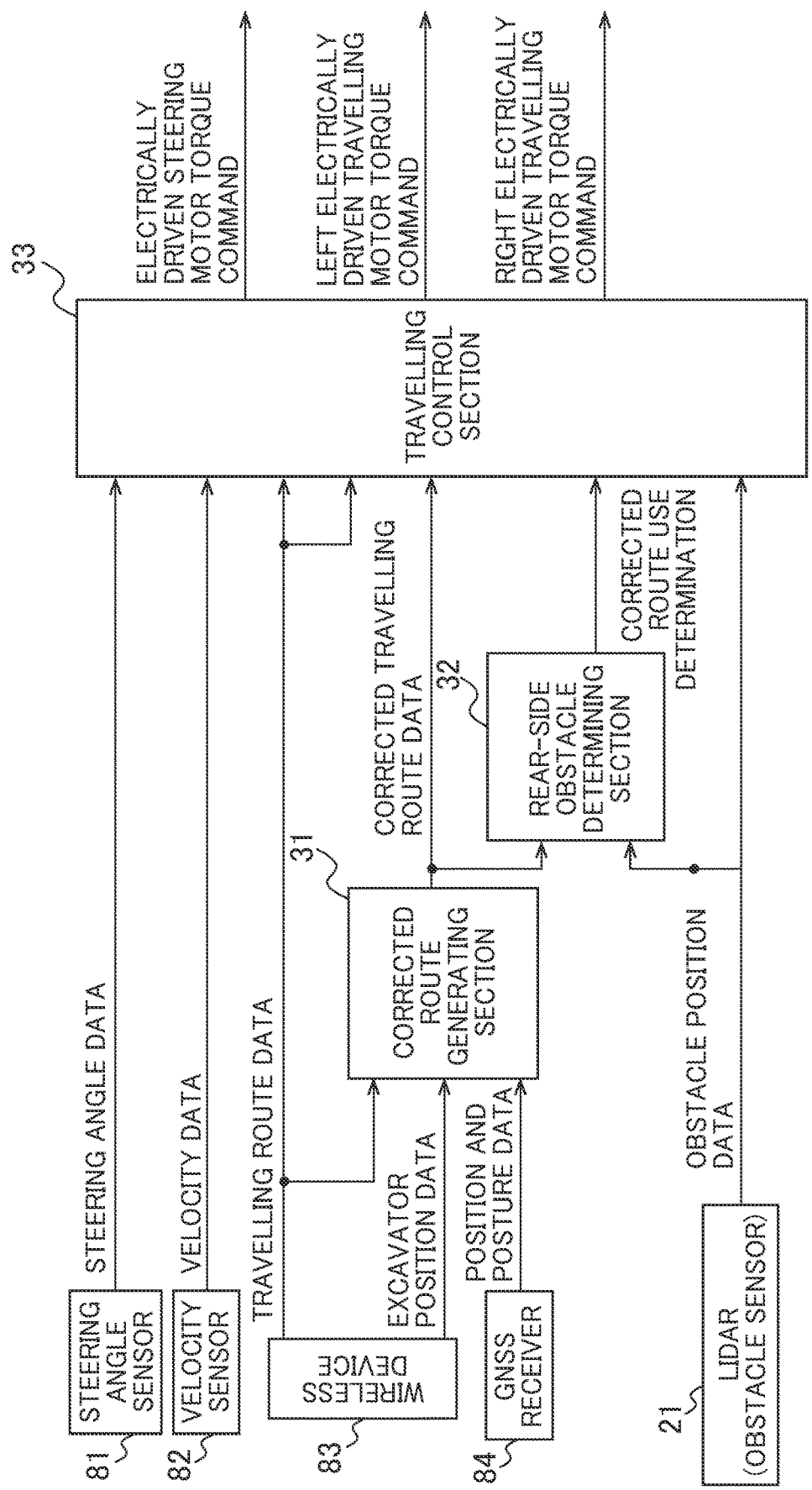
FIG. 3 is a functional block diagram of a controller according to the embodiment of the present invention.

FIG. 3 is a functional block diagram in which computations carried out in the controller 30 are illustrated in such a manner as to be classified by blocks. The controller 30 functions as a corrected route generating section 31, a rear-side obstacle determining section 32, and a travelling control section 33.

The corrected route generating section 31 corrects a travelling route 61 (see FIG. 5) prescribed by the travelling route data received from the server 300 to generate a post-correction travelling route 62 (see FIG. 5) on the basis of the travelling route data, the position data (swing center position data) of the excavator 200, and the position data and the posture data of the dump truck 100 in such a manner as to allow the dump truck 100 to stop with a position and a direction (an orientation) with which the excavator 200 easily carries out loading work.

The rear-side obstacle determining section 32 determines whether or not there is a possibility that the dump truck 100 collides with an obstacle if it travels on the post-correction travelling route 62 generated in the corrected route generating section 31, on the basis of the position data of an obstacle sensed by the obstacle sensor 21 that senses an obstacle existing in the advancing direction of the dump truck 100 and data of the post-correction travelling route 62 (corrected travelling route data) generated in the corrected route generating section 31. When it is determined that there is a possibility of contact with an obstacle in this determination, the rear-side obstacle determining section 32 outputs, to the travelling control section 33, information indicating that the post-correction travelling route 62 cannot be used as the travelling route of the dump truck 100 (corrected route use determination).

The travelling control section 33 computes a target velocity and a target steering angle of the dump truck 100 to cause the dump truck 100 to travel on the pre-correction travelling route 61 or the post-correction travelling route 62, generates a torque command to the left and right electrically driven travelling motors 19L and 19R and the electrically driven steering motor 17 to implement the computed velocity and angle, and outputs the generated torque command to the corresponding motors 19L, 19R, and 17.

Figure 4:
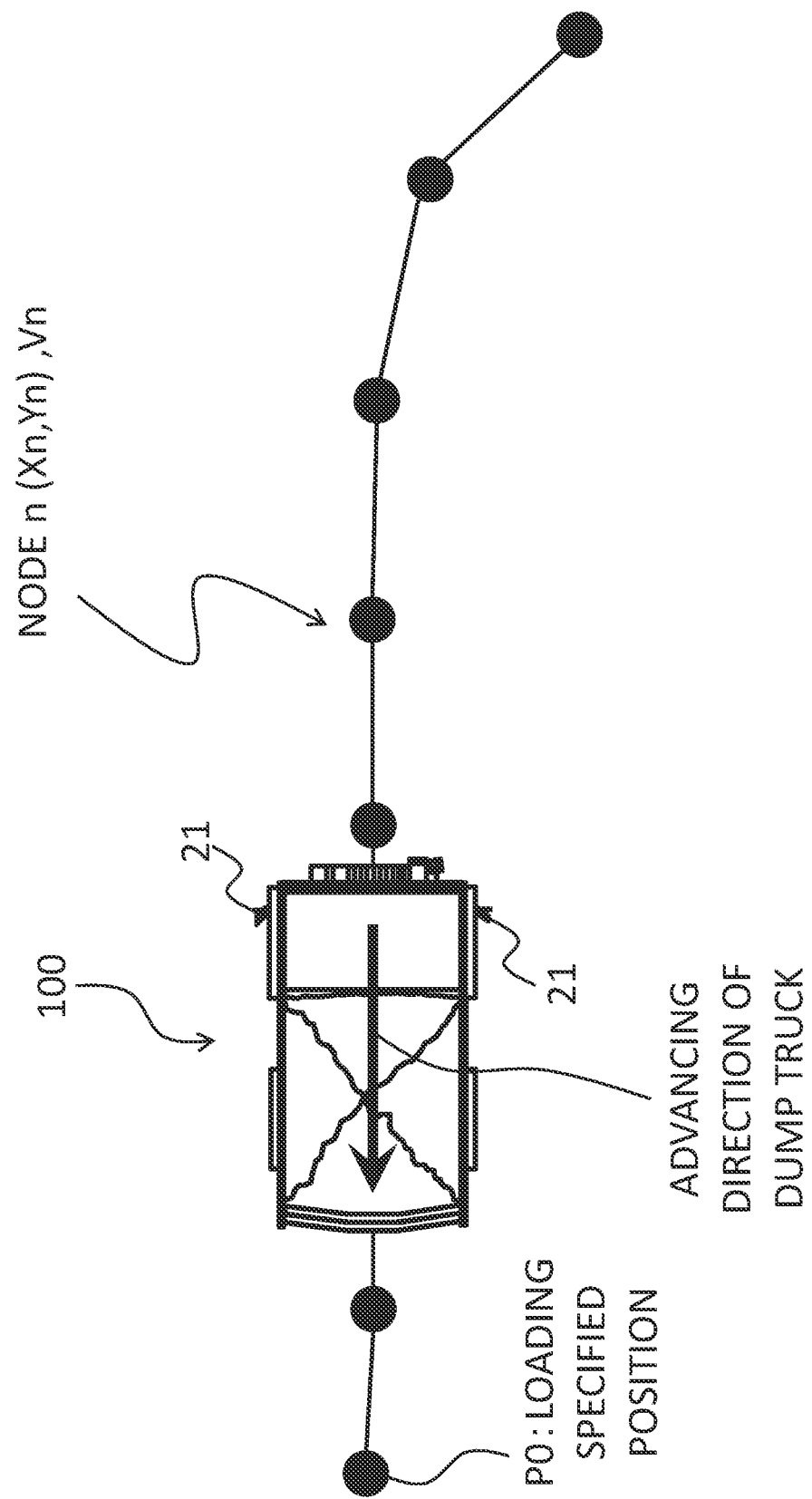
FIG. 4 is an explanatory diagram of a travelling route of the dump truck of the autonomous travelling type.

The pre-correction and post-correction travelling routes 61 and 62 are given as strings of points referred to as nodes. That is, a collection of pieces of position data of multiple nodes that configure each travelling route becomes the travelling route data. The position of each node can be defined on an orthogonal coordinate system (a site coordinate system) in which the east is defined as the +x direction, the north is defined as the +y direction, and a certain point in a mine is the origin, for example. FIG. 4 is an explanatory diagram of the travelling route. As in this diagram, for each node n (n is a natural number) in the travelling route data, not only coordinates $(X_n, Y_n)$ thereof but also a target velocity $V_n$ for the dump truck 100 to pass the node n is set. The controller 30 carries out control of acceleration or deceleration of the electrically driven travelling motors 19 on the basis of deviation between the actual velocity acquired by the velocity sensor 82 and the target velocity Vn.

(Corrected Route Generating Section 31)

Figure 5:
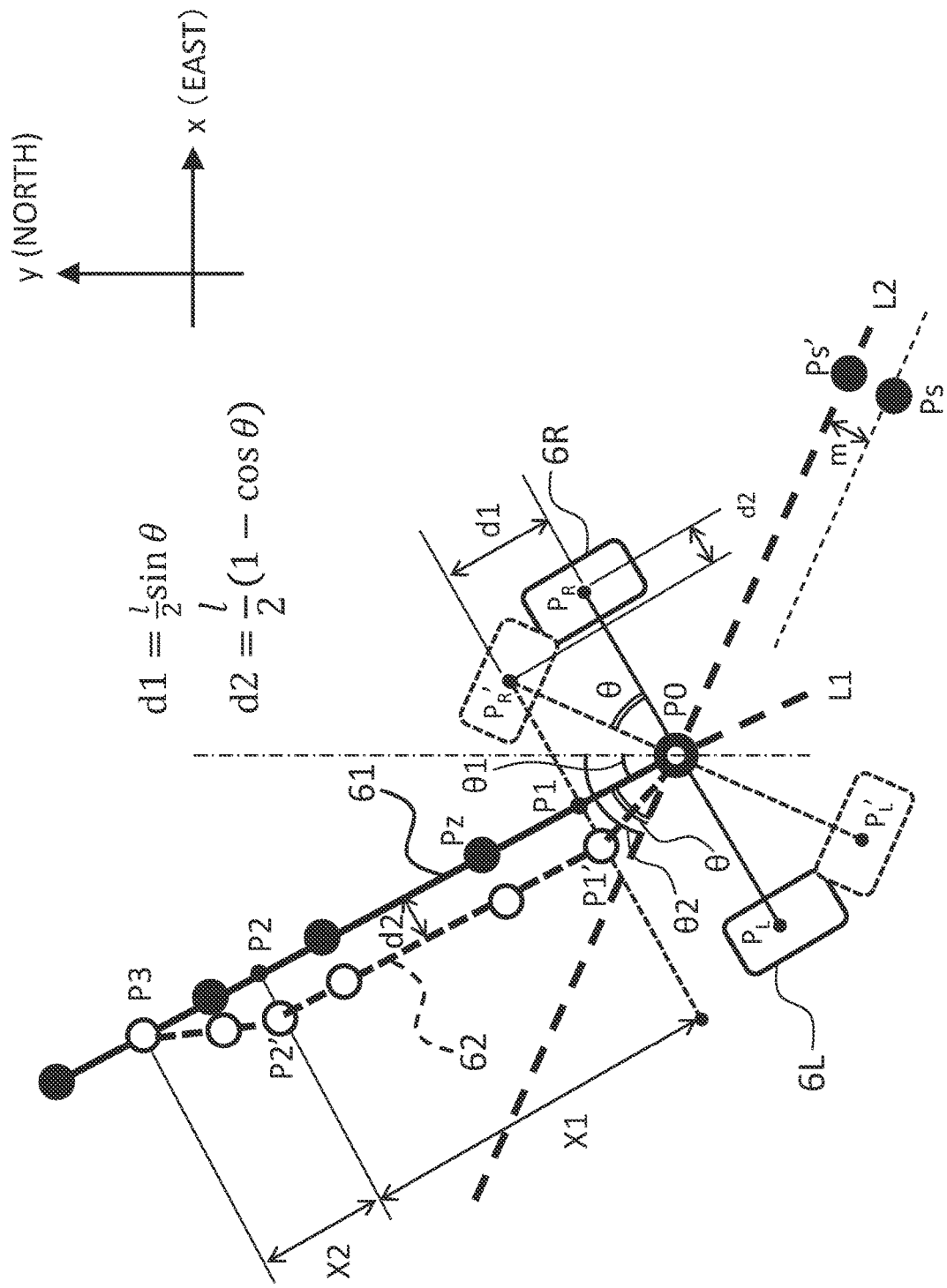
FIG. 5 is a geometric explanatory diagram for explaining logic of generation of a post-correction travelling route by a corrected route generating section 31.

Next, generation processing of the post-correction travelling route 62 executed in the corrected route generating section 31 will be described in more detail by using FIG. 5. FIG. 5 is a geometric explanatory diagram for explaining logic of the corrected route generating section 31. Multiple large black points in the diagram each indicate the node of the original travelling route 61 received from the server 300.

A point P0 in the diagram represents the node of the loading specified position. The loading specified position P0 is a point specified by an operator of the excavator 200 as a reference position at the time when the excavator 200 loads the vessel 3 of the dump truck 100 with a load by using a front work device 51 (see FIG. 6), and is directly or indirectly transmitted in a wireless manner to the controller 30 from the controller of the excavator 200.

Further, in FIG. 5, the position of the right rear wheel 6R and the position of the left rear wheel 6L in a case in which the dump truck 100 has travelled on the travelling route 61 and stopped at the loading specified position P0 (in the example of the diagram, a case in which a center of an axle of the rear wheels 6 (a rear axle) of the dump truck 100 is located on the loading specified position P0) are defined as PR and PL, respectively, and the axle that connects the left and right rear wheels 6L and 6R to each other is drawn by a solid line that connects the two points PR and PL to each other. A distance between the point PR and the point PL will be sometimes referred to as an inter-rear-wheel distance, and the distance is defined as 1. Further, the front-rear direction of the dump truck 100 in this case (the case in which the dump truck 100 has travelled on the travelling route 61 and stopped at the loading specified position P0) will be sometimes referred to as a first stop direction. The first stop direction is a straight line that passes through a center of the dump truck 100 in the longitudinal direction of the dump truck 100 and passes through the loading specified position P0 on an xy plane in the site coordinate system. The first stop direction is also a line of intersection between a plane orthogonal to the rear axle of the dump truck 100 and the xy plane in the site coordinate system. Moreover, the first stop direction is also a straight line L1 obtained by extending a line segment that connects the loading specified position P0 that is the node of the end point of the travelling route 61 to a node Pz previous to the end point. The first stop direction can be computed based on the travelling route data (for example, position data of the loading specified position P0 and the node Pz included in the travelling route data).

Figure 6:
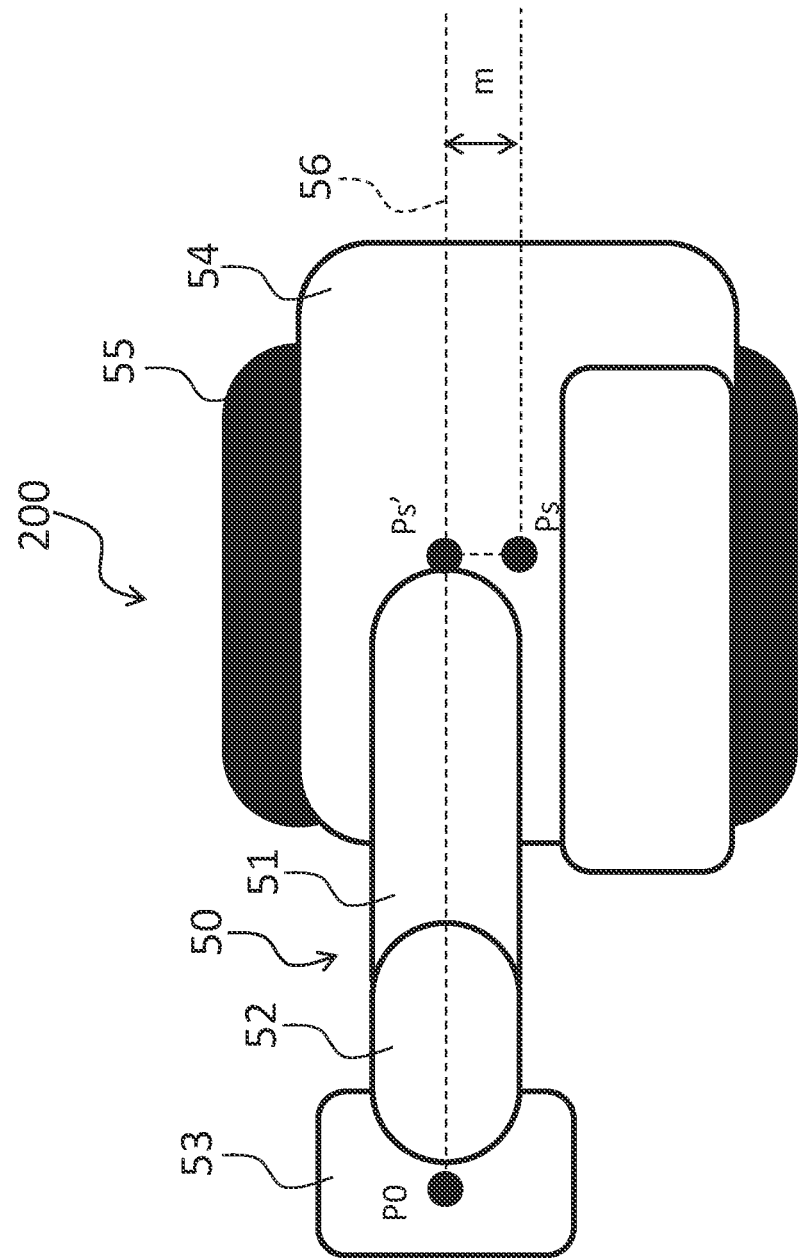
FIG. 6 is a top view of an excavator 200 held with such a posture that a movement plane 56 of a front work device 50 passes through a loading specified position P0.

Here, as a point relating to the excavator 200, a swing center position Ps and a point Ps' will be described by using FIG. 6. FIG. 6 is a top view of the excavator 200 held with such a posture that a movement plane 56 of the front work device 50 passes through the loading specified position P0. The excavator 200 of FIG. 6 includes a lower track structure 55, an upper swing structure 54 swingably attached onto the lower track structure 55, and the front work device 50 that is attached to the upper swing structure 54 and includes a boom 51, an arm 52, and a bucket 53. The movement plane 56 of the front work device 50 is a plane in which all front components 51, 52, and 53 that configure the front work device 50 can move, and passes through a center of the front work device 50 in the left-right direction in the example of FIG. 6. The point Ps is a position of a swing center of the upper swing structure 54. The point Ps' is a foot of a perpendicular drawn from the swing center position Ps to the movement plane 56 of the front work device 50. Here, a length of the perpendicular is defined as m. The swing center position Ps and the point Ps' illustrated in FIG. 5 are obtained when the front work device 50 is kept in such a posture that the movement plane 56 passes through the loading specified position P0.

In the present embodiment, the position of the excavator 200 is defined with the swing center position Ps. However, the position may be any position as long as it is a point whose position with respect to two GNSS antennas (not illustrated) attached to the upper swing structure 54 is known. The swing center position Ps and the orientation of the front work device 50 (the upper swing structure 54) can be computed based on signals (navigation signals) received from multiple positioning satellites by the two GNSS antennas in a GNSS receiver (not illustrated) mounted in the excavator 200.

Referring back to FIG. 5, a straight line L2 illustrated by a dashed line is a straight line that is defined on the xy plane in the site coordinate system and connects the loading specified position P0 and the point Ps' to each other at the time when the front work device 50 of the excavator 200 is kept in such a posture that the movement plane 56 passes through the loading specified position P0. The position of the right rear wheel 6R and the position of the left rear wheel 6L in a case in which this straight line L2 coincides with the front-rear direction of the dump truck 100 when the dump truck 100 has stopped at the loading specified position P0 (referred to as a "second stop direction") are defined as PR' and PL', respectively, and the axle at the time is drawn by a dotted line that connects the two points PR' and PL' to each other.

In a case in which the swing center position of the excavator 200 is located at the point Ps in FIG. 5 and the dump truck 100 is stopped at the loading specified position P0, if the dump truck 100 is stopped with the direction thereof kept aligned with the second stop direction (the straight line L2), the movement plane 56 of the front work device 50 coincides with the front-rear direction of the dump truck 100 on the xy plane, and therefore, loading work by the excavator 200 becomes easy.

Thus, the corrected route generating section 31 in the present embodiment corrects the travelling route 61 to generate the post-correction travelling route 62 in such a manner that the front-rear direction (the second stop direction) of the dump truck 100 in a case in which the dump truck 100 has travelled (moved rearward) on the post-correction travelling route 62 and stopped at the loading specified position P0 coincides with the straight line L2 (the movement plane 56 that passes through the loading specified position P0) or an angle formed by the second stop direction and the straight line L2 comes close to zero. More specifically, before the dump truck 100 reaches the loading specified position P0, the corrected route generating section 31 computes, based on the travelling route data, the first stop direction L1 that is the front-rear direction of the dump truck 100 in the case in which the dump truck 100 has travelled (moved rearward) on the pre-correction travelling route 61 and stopped at the loading specified position P0. The corrected route generating section 31 then corrects the travelling route 61 to compute the post-correction travelling route 62 on the basis of the computed first stop direction L1, the position data of the loading specified position P0, and the position data (in the example of FIG. 5, the data of the swing center position) Ps of the excavator 200 in such a manner that the second stop direction coincides with the straight line L2 (the movement plane 56 that passes through the loading specified position P0) or the angle formed by the second stop direction and the straight line L2 comes close to zero.

When correcting the travelling route 61 to the post-correction travelling route 62, the corrected route generating section 31 in the present embodiment uses d1 (a first distance) and d2 (a second distance) that are two distances illustrated in FIG. 5. d1 (the first distance) is a distance (deviation) in the first stop direction (the direction orthogonal to the rear axle) between PR (a first position) and PR' (a second position) in the case in which the dump truck 100 has travelled on the pre-correction travelling route 61 and stopped at the loading specified position P0, the first position PR being the position of one rear wheel (a first rear wheel) 6R in the left-right direction of the dump truck, the second position PR' being the position of the one rear wheel (the first rear wheel) 6R in the case in which the dump truck 100 has travelled on the post-correction travelling route 62 and stopped at the loading specified position P0. d2 (the second distance) is a distance (deviation) in a direction orthogonal to the first stop direction (the direction of the rear axle) between the first position PR and the second position PR'. Next, a computation process of d1 (the first distance) and d2 (the second distance) by the corrected route generating section 31 will be described.

An angle formed by the straight line L1 (the first stop direction) and the straight line L2 (the movement plane 56 that passes through the loading specified position P0) is defined as θ. Where coordinates of the loading specified position P0 are (x0, y0), coordinates of the node Pz are (x1, y1), coordinates of the swing center position Ps are (xs, ys), coordinates of the foot Ps' of the perpendicular drawn from the swing center position Ps to the movement plane 56 are (xs', ys'), the length of the perpendicular is m, an angle formed by the straight line L1 and the y-axis is θ1, and an angle formed by the straight line L2 and the y-axis is θ2, θ is a difference between θ1 and θ2 and can be computed by the following expression (1).

[Math. 1]

$$\theta = \theta 2 - \theta 1 = \tan^{-1}\left(\frac{x0 - xs'}{y0 - ys'}\right) - \tan^{-1}\left(\frac{x1 - x0}{y1 - y0}\right) \quad \text{expression (1)}$$

d1 (the first distance) and d2 (the second distance) can be represented by the following expressions (2) and (3) with use of θ computed by the above expression (1) and the inter-rear-wheel distance l. That is, d1 and d2 can be computed from the coordinates (x0, y0) of the loading specified position P0, the coordinates (x1, y1) of the node P1, the coordinates (xs', ys') of the foot Ps' of the perpendicular drawn from the swing center position Ps to the movement plane 56, and the inter-rear-wheel distance l.

[Math. 2]

$$d1 = \frac{l}{2}\sin\theta \quad \text{expression (2)}$$

[Math. 3]

$$d2 = \frac{l}{2}(1 - \cos\theta) \quad \text{expression (3)}$$

The corrected route generating section 31 computes a point P1 (a first point) separate from the loading specified position P0 by the distance d1 (the first distance) on the pre-correction travelling route 61, a point P2 (a second point) further separate from the point P1 (the first point) by a predetermined distance X1 on the same travelling route 61, and P3 (a third point) further separate from the point P2 (the second point) by a predetermined distance X2 on the same travelling route 61. Then, the corrected route generating section 31 translates the travelling route 61 between the point P1 (the first point) and the point P2 (the second point) in the direction orthogonal to the first stop direction by the distance d2 (the second distance) and deems the points on the post-correction travelling route 62 resulting from the translation of the two points P1 and P2 as P1' and P2'. Then, the corrected route generating section 31 computes, as the post-correction travelling route 62, a route obtained by connecting the point P1' to the loading specified position P0 by a circular arc having the point PR' as the center of the circle and smoothly connecting the point P2' to the point P3 (a line that connects the point P3, the point P2', the point P1', and the point P0 to each other).

The target velocity prescribed for each node on the post-correction travelling route 62 can be taken over from the node corresponding to each node on the pre-correction travelling route 61. The target velocity for a node newly generated in the post-correction travelling route 62 can be set by interpolating based on values for the nodes the target velocity of which is known, for example. Furthermore, it is preferable that X1 and X2 used in the above be set to lengths with which steering can be sufficiently completed when the dump truck 100 attempts to travel on the post-correction travelling route 62, in view of the fact that the vehicle body travels at a very low velocity at the time of position adjustment with a rearward movement and the steering performance of the vehicle body.

(Rear-Side Obstacle Determining Section 32)

Figure 7:
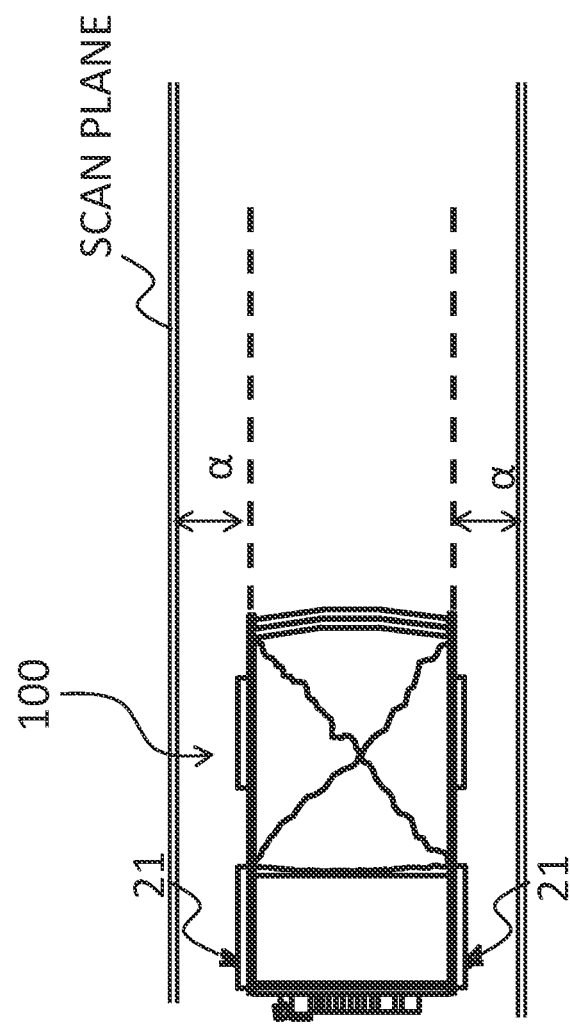
FIG. 7 is an explanatory diagram of detection ranges of LIDARs (obstacle sensors).

The rear-side obstacle determining section 32 receives rear-side obstacle coordinates (obstacle position data) from the obstacle sensor 21, determines whether or not the dump truck 100 gets contact with an obstacle when travelling on the post-correction travelling route 62 or during travelling on the post-correction travelling route 62 on the basis of the rear-side obstacle coordinates and the position data of the post-correction travelling route 62, and outputs the corrected route use determination (TRUE or FALSE) according to the determination result. The corrected route use determination is used for determination about which travelling route of the pre-correction travelling route 61 and the post-correction travelling route 62 the dump truck 100 is made to travel on. It is desirable that the obstacle sensor 21 be a sensor that can detect an obstacle in a wide range. In the present embodiment, as in FIG. 7, two LIDARs that can each scan a range of ½×vehicle body width W+α[m] in the vehicle body front-rear direction (the longitudinal direction) are mounted as the obstacle sensors 21. Double lines in the diagram represent scan planes of the LIDARs.

Figure 8:
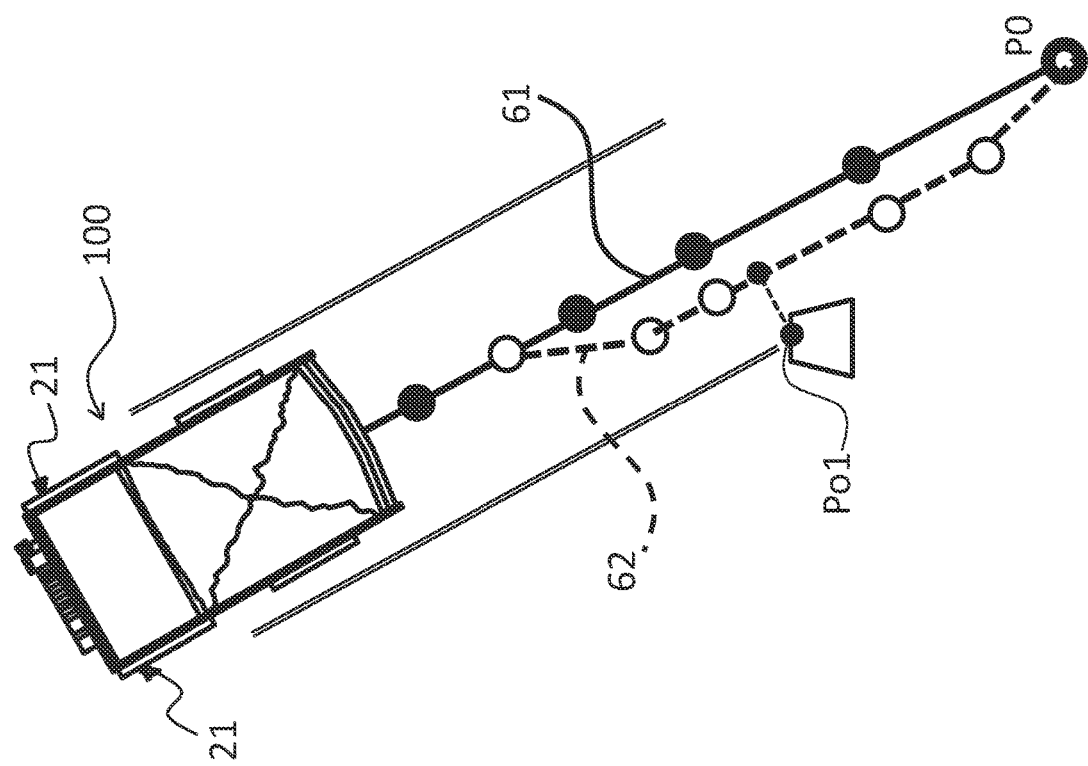
FIG. 8 is a diagram illustrating a case in which an obstacle is detected during travelling of the dump truck 100 on a pre-correction travelling route 61 after a post-correction travelling route 62 is generated.

FIG. 8 illustrates a case in which an obstacle is detected by the obstacle sensor 21 during travelling of the dump truck 100 on the pre-correction travelling route 61 after the post-correction travelling route 62 is generated. When a length of a perpendicular drawn from rear-side obstacle coordinates Po1, which is received from the obstacle sensor 21, to the post-correction travelling route 62 is equal to or shorter than the vehicle body width W of the dump truck 100 as in FIG. 8, the rear-side obstacle determining section 32 determines that there is a fear that the dump truck 100 collides with the relevant obstacle if it travels on the post-correction travelling route 62, and outputs FALSE as the corrected route use determination. That is, the dump truck 100 is controlled to travel on the pre-correction travelling route 61. On the other hand, the rear-side obstacle determining section 32 outputs TRUE as the corrected route use determination when the length of the perpendicular is larger than the vehicle body width W or when no obstacle is detected by the obstacle sensor 21.

Figure 9:
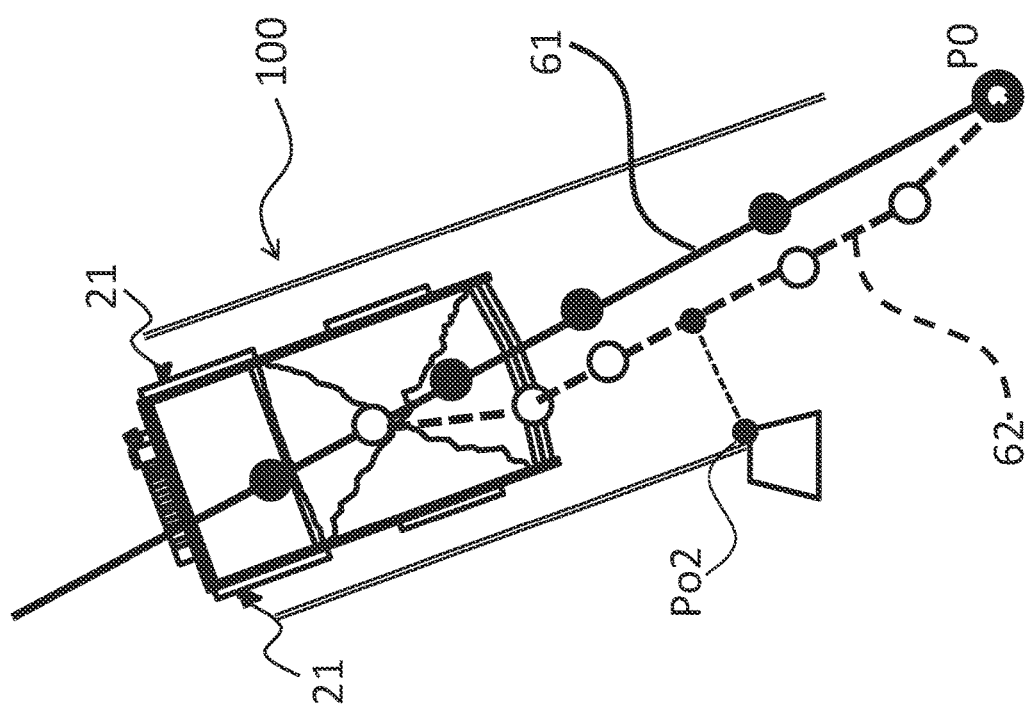
FIG. 9 is a diagram illustrating a case in which an obstacle that has not been sensed during travelling on the pre-correction travelling route 61 is detected when the dump truck 100 is about to travel on the post-correction travelling route 62 or during travelling of the dump truck 100 on the post-correction travelling route 62.

FIG. 9 illustrates a case in which an obstacle that has not been sensed during travelling on the pre-correction travelling route 61 is detected by the obstacle sensor 21 when the dump truck 100 is about to travel on the post-correction travelling route 62 or during travelling of the dump truck 100 on the post-correction travelling route 62. Also in this case, similarly to the case of FIG. 8, the rear-side obstacle determining section 32 determines that there is a fear that the dump truck 100 collides with the relevant obstacle if it travels on the post-correction travelling route 62, and outputs FALSE as the corrected route use determination. That is, the dump truck 100 is controlled to travel on the pre-correction travelling route 61. Further, similarly to the case of FIG. 8, the rear-side obstacle determining section 32 outputs TRUE as the corrected route use determination when the length of the perpendicular is larger than the vehicle body width W or when no obstacle is detected by the obstacle sensor 21.

While, in this example, the rear-side obstacle determining section 32 determines that there is a possibility of collision when the length of the perpendicular is equal to or shorter than the vehicle body width W, the vehicle body width W is merely one example, and another threshold may be used. Moreover, here, the corrected route use determination is carried out with focus only on the distance from the post-correction travelling route 62 (the length of the perpendicular). However, when the distance from the post-correction travelling route 62 is equal to or shorter than the vehicle body width W (when the dump truck 100 is to collide with an obstacle if it travels on the post-correction travelling route 62), it may be determined whether or not the distance between the relevant rear-side obstacle coordinates Po1 and the pre-correction travelling route 61 is equal to or shorter than the vehicle body width W, and travelling on the pre-correction travelling route 61 may be allowed when the distance is larger than the vehicle body width W. When the dump truck 100 is to collide with an obstacle even if it travels on the pre-correction travelling route 61, the dump truck 100 may be stopped before reaching the obstacle.

(Travelling Control Section 33)

The travelling control section 33 uses the post-correction travelling route 62 when the corrected route use determination output by the rear-side obstacle determining section 32 is TRUE and uses the pre-correction travelling route 61 when the corrected route use determination is FALSE, and controls travelling of the dump truck 100.

Figure 10:
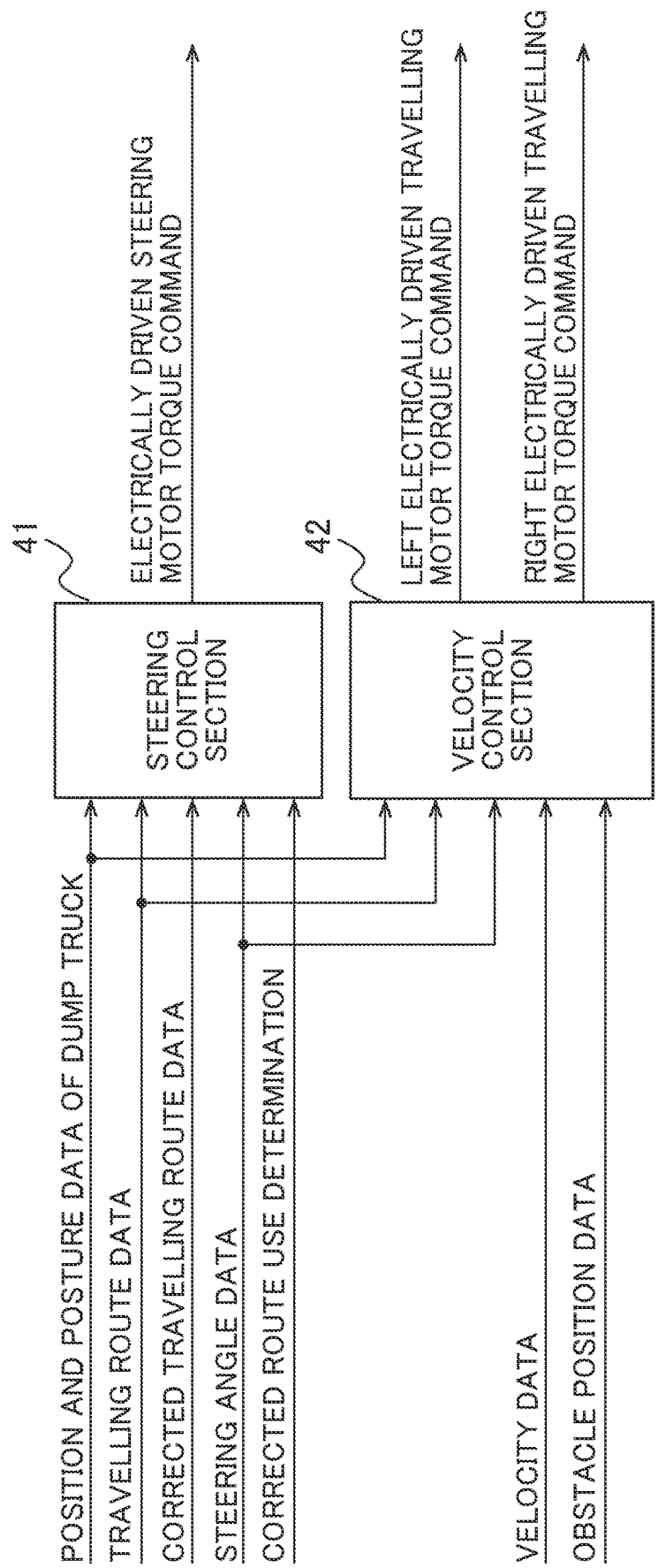
FIG. 10 is a functional block diagram of a travelling control section 33.

FIG. 10 is a functional block diagram of the travelling control section 33. As illustrated in this diagram, the travelling control section 33 includes a steering control section 41 that controls the steering angle of the dump truck 100 and a velocity control section 42 that controls the velocity of the dump truck 100.

(A) Case of Travelling to Point P0 on Travelling Route 61 or to Point P1' on Post-Correction Travelling Route 62

Velocity control and steering control by the travelling control section 33 when the dump truck 100 is caused to travel to the loading specified position P0 on the pre-correction travelling route 61 or to the point P1' on the post-correction travelling route 62 are carried out as follows.

The velocity control section 42 carries out feedback control based on the actual velocity of the dump truck 100 computed from the sensor value (the velocity data) of the velocity sensor 82 and the target velocity prescribed for each node of the travelling route, and computes the torque of the left and right electrically driven travelling motors 19L and 19R to cause the actual velocity of the dump truck 100 to come close to the target velocity. However, it is assumed here that position adjustment is carried out with a rearward movement, and therefore, the lowest velocity of the vehicle body is assumed as the target velocity, and the target velocity is set to 5 [km/h], for example. Further, when the dump truck 100 has reached the vicinity of the loading specified position P0, the target velocity is set to 0 [km/h] and the full brake is driven, to thereby stop the dump truck 100 at a desired position.

The steering control section 41 deems, as a target, a point (a front-side gaze point) on the route separate forward from the present position in the advancing direction of the dump truck 100 by a certain distance (a front-side gaze distance), and decides a target value of steering on the basis of an angle formed by a present yaw angle of the vehicle body and a straight line that connects the present position to the front-side gaze point. Here, the front-side gaze distance is set to 10 [m] in consideration of the fact that the vehicle velocity is slow. With the target value of steering decided, the steering control section 41 computes a torque command of the electrically driven steering motor 17 by feedback control of the steering target value and the present steering angle.

By outputting the travelling electrically driven motor torque command and the electrically driven steering motor torque command computed in the above to the inverter and driving the respective motors, the dump truck 100 travels without departing from the route.

(B) Case of Travelling from Point P1' on Post-Correction Travelling Route 62 to Point P0

Velocity control in the case of travelling from the point P1' to the loading specified position P0 on the post-correction travelling route 62 is carried out as follows.

At the time when the dump truck 100 reaches the point P1' on the post-correction travelling route 62, either one of the left and right rear wheels 6 has reached the above-described point PL' or point PR'. Thus, the velocity control section 42 sets the target velocity of the rear wheel 6 that has not yet reached the point to 5 [km/h] and sets the target velocity of the rear wheel 6 that has reached the point to 0 [km/h] and computes the torque of the left and right electrically driven travelling motors 19L and 19R. Simultaneously with this, the steering control section 41 outputs a torque command of the electrically driven steering motor 17 to cause the steering angle to become parallel to the direction of the vehicle body of the dump truck 100. At this time, the dump truck 100 makes circular motion around the one rear wheel 6 that has reached the point PL' or the point PR', and the other rear wheel 6 that has not yet reached the point PL' or the point PR' gets closer to the point PL' or the point PR'. Eventually, at the time when both of the left and right rear wheels 6 have reached the respective points PL' and PR' and the steering angle has become parallel to the vehicle body, the steering control section 41 sets the torque command of the respective electrically driven travelling motors 19L and 19R to 0 to complete the stop.

On the other hand, in the case in which the dump truck 100 is travelling on the post-correction travelling route 62 in the state in which the corrected route use determination is TRUE, when the corrected route use determination is switched to FALSE, the travelling route is immediately returned to the pre-correction travelling route 61, and the above-described control is similarly carried out.

Furthermore, in the velocity control section 42, the rear-side obstacle coordinates and the present coordinates (the position data) of the dump truck 100 are compared with each other irrespective of whether the travelling route is the post-correction travelling route 62. When the distance between the rear-side obstacle coordinates and the present coordinates of the dump truck 100 has become equal to or shorter than a certain distance, the dump truck 100 is immediately stopped by the full brake to avoid collision with the rear-side obstacle.

(Flowchart)

Figure 11:
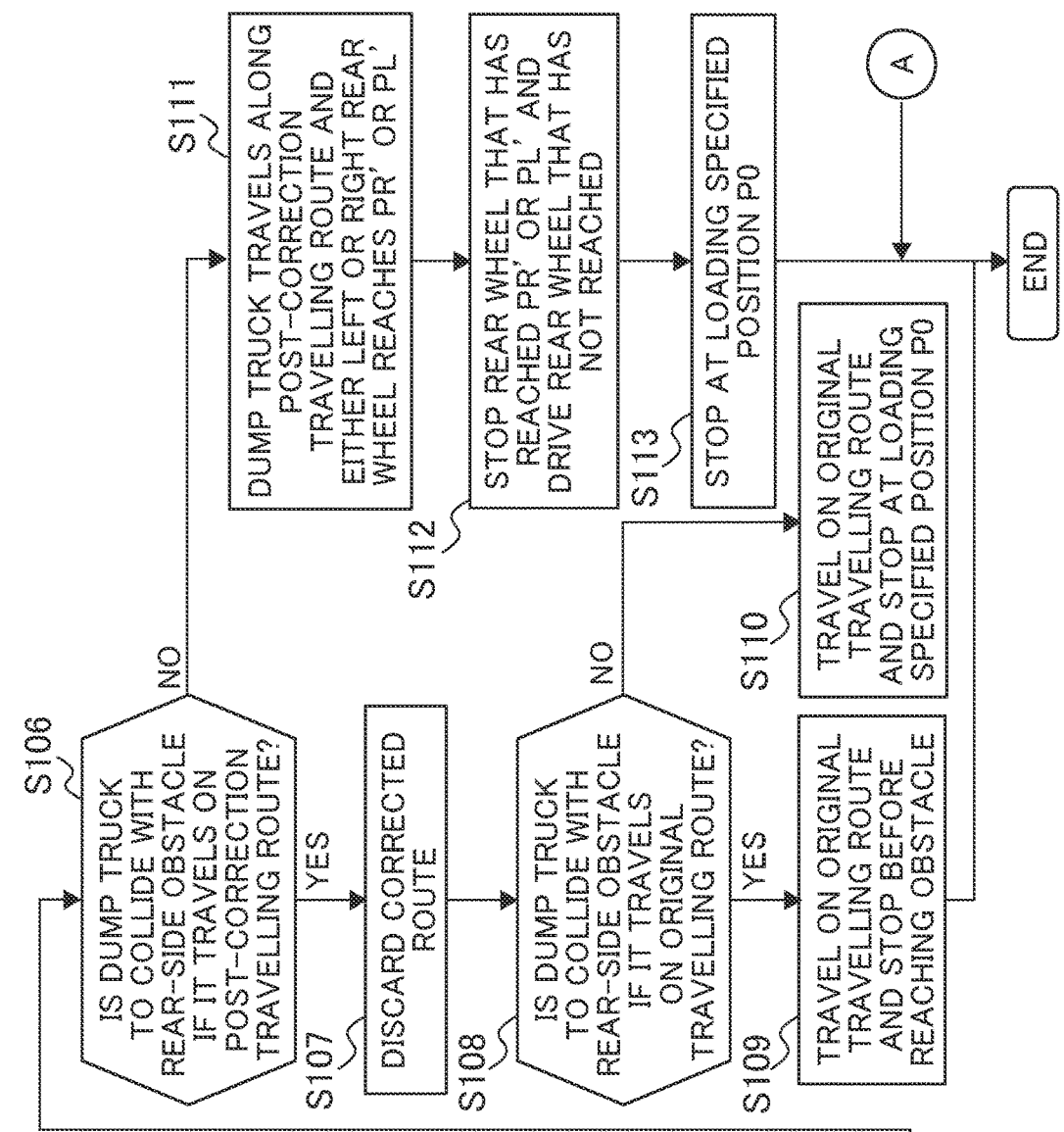
FIG. 11 is one example of a flowchart of processing executed by the controller 30 according to the present embodiment.

Here, one example of control flow of the dump truck 100 carried out by the controller 30 configured as described above will be described. FIG. 11 is one example of a flowchart of processing executed by the controller 30 according to the present embodiment. The controller 30 carries out the flow of FIG. 11 at a predetermined cycle.

In S101, the controller 30 (the corrected route generating section 31) receives the travelling route data from the server 300 in the control center through the wireless device 83.

In S102, the controller 30 (the corrected route generating section 31) determines whether or not the node of the termination of the travelling route indicated by the travelling route data received in S101 is the loading specified position P0. The controller 30 proceeds to S103 when it is determined that the node of the termination is the loading specification P0, and ends the processing if this is not the case.

In S103, the controller 30 (the corrected route generating section 31) receives the position data of the excavator 200 (the coordinates (xs, ys) of the swing center position Ps) from, for example, the excavator 200 and computes the coordinates (xs', ys') of the point Ps' from the coordinates (xs, ys) and the coordinates (x0, y0) of the loading specified position P0. Then, the controller 30 (the corrected route generating section 31) computes θ from the computed coordinates (xs', ys') of the point Ps', the coordinates (x0, y0) of the loading specified position P0, the coordinates (x1, y1) of the node Pz, and the above-described expression (1). Needless to say, the coordinates (x0, y0) of the loading specified position P0 and the coordinates (x1, y1) of the node Pz that define the straight line L1 (the first stop direction) are included in the travelling route data received in S101.

In S104, the controller 30 (the corrected route generating section 31) determines whether or not θ computed in S103 is 0. When it is determined that θ≠0, the controller 30 proceeds to S105. In the case of θ≠0, the travelling route does not need to be corrected, and therefore, the controller 30 ends the processing.

In S105, the controller 30 (the corrected route generating section 31) computes the distances d1 and d2 by using θ computed in S103 and the above-described expressions (2) and (3) and generates the post-correction travelling route 62 from the travelling route 61 by using the method described in the above.

In S106, the controller 30 (the rear-side obstacle determining section 32) receives the rear-side obstacle coordinates (the obstacle position data) from the obstacle sensor 21, and determines whether or not the dump truck 100 is to collide with an obstacle if it is caused to travel on the post-correction travelling route 62, on the basis of the position data of the post-correction travelling route 62 generated in S105 and the rear-side obstacle coordinates. The controller 30 proceeds to S107 when it is determined that the dump truck 100 is to collide with an obstacle if it is caused to travel on the post-correction travelling route 62, but proceeds to S116 when it is determined that the dump truck 100 is not to collide with an obstacle.

In a step S111, the controller 30 (the travelling control section 33) causes the dump truck 100 to travel along the post-correction travelling route 62 and controls the travelling of the dump truck 100 until either one of the left and right rear wheels 6 reaches the point PL' or the point PR' (see FIG. 5).

In a step S112, the controller 30 (the travelling control section 33) stops the driving of one of the left and right rear wheels 6 that has first reached the point PL' or the point PR' (see FIG. 5) and drives the other rear wheel 6 that has not reached the point according to the target velocity (5 [km/h]). When the other rear wheel 6 reaches the point PL' or the point PR', the controller 30 stops the dump truck (S113) and ends the processing. This can stop the dump truck 100 at the loading stop position P0 with the front-rear direction of the dump truck 100 aligned with the straight line L2, so that loading work by the excavator 200 becomes easy.

On the other hand, when it is determined in S106 that the dump truck 100 is to collide with an obstacle if it is caused to travel on the post-correction travelling route 62, the controller 30 discards the post-correction travelling route 62 (S107) and proceeds to a step S108.

In the step S108, the controller 30 (the rear-side obstacle determining section 32) determines whether or not the dump truck 100 is to collide with an obstacle if it is caused to travel on the pre-correction travelling route 61 received in S101, on the basis of the position data of the travelling route 61 and the rear-side obstacle coordinates. The controller 30 proceeds to S109 when it is determined that the dump truck 100 is to collide with an obstacle if it is caused to travel on the travelling route 61, but proceeds to S110 when it is determined that the dump truck 100 is not to collide with an obstacle.

In the step S109, the controller 30 (the travelling control section 33) causes the dump truck 100 to travel along the pre-correction travelling route 61 and stops the dump truck 100 before reaching the rear-side obstacle to end the processing.

In the step S110, the controller 30 (the travelling control section 33) causes the dump truck 100 to travel along the pre-correction travelling route 61 and stops the dump truck 100 at the loading specified position P0 to end the processing.

In the flowchart of FIG. 11, the processing in the case in which the post-correction travelling route 62 is discarded due to the existence of an obstacle and the pre-correction travelling route 61 is used (S106, S107, S108, S109, S110) is also included. However, this processing can be omitted when it is obvious that no obstacle exists.

(Effects)

According to the present embodiment described above, the following operation and effects can be obtained.

(1) In the present embodiment, the post-correction travelling route 62 is generated in such a manner that the movement plane 56 (the straight line L2) of the front work device 50 (the bucket 53) of the excavator 200 at the time when the front work device 50 is moved to the loading specified position P0 coincides with the front-rear direction (the second stop direction) of the dump truck 100 at the loading specified position P0, and the dump truck is controlled to travel on the post-correction travelling route 62 and stop at the loading specified position P0. This can alleviate difficulty of work and fatigue for the excavator operator who carries out loading work and prevent an unnecessary increase in cycle time.

However, the second stop direction and the movement plane 56 (the straight line L2) do not need to be made to coincide with each other completely, and it is sufficient if the angle formed by them on the xy plane is brought close to zero. According to this viewpoint, as long as the excavator 200 is located on an extension line of the second stop direction (the straight line L2), the loading work by the excavator 200 becomes easy compared with other cases. That is, the corrected route generating section 31 may compute, based on the travelling route data, the first stop direction L1 that is the front-rear direction of the dump truck 100 in the case in which the dump truck 100 has travelled (moved rearward) on the pre-correction travelling route 61 and stopped at the loading specified position P0, and may correct the travelling route 61 to compute the post-correction travelling route 62 in such a manner that the excavator 200 is located on an extension line of the second stop direction L2 that is the front-rear direction of the dump truck 100 in the case in which the dump truck 100 has travelled (moved rearward) on the post-correction travelling route 62 and stopped at the loading specified position P0, on the basis of the computed first stop direction L1, the position data of the loading specified position P0, and the position data (in the example of FIG. 5, the data of the swing center position) Ps of the excavator 200.

(2) In the present embodiment, the post-correction travelling route 62 is generated by employing, as a reference, a line segment obtained by translating a partial section of the pre-correction travelling route 61. This can generate the post-correction travelling route 62 through the minimum route correction, and the possibility of travelling on a route completely different from the pre-correction travelling route 61 is reduced. Thus, the possibility of contact with an obstacle that is not assumed originally can be suppressed.

(3) In the present embodiment, when an obstacle is sensed during travelling of the dump truck 100 on the pre-correction travelling route 61, it is determined whether or not there is a possibility that the dump truck 100 gets contact with the obstacle when travelling on the post-correction travelling route 62, and the dump truck 100 is caused to travel on the original travelling route 61 without travelling on the post-correction travelling route 62 when there is the possibility of contact. This can avoid the possibility of contact with the obstacle due to travelling on the post-correction travelling route 62 and occurrence of a situation in which, in order to avoid contact with the obstacle, the dump truck 100 needs to be stopped before reaching the obstacle.

(4) In the present embodiment, when an obstacle is sensed during travelling of the dump truck 100 on the post-correction travelling route 62, it is determined whether or not there is a possibility that the dump truck 100 gets contact with the obstacle during the travelling on the post-correction travelling route 62, and the travelling route is switched to the original travelling route 61 when there is the possibility of contact. This can avoid the possibility of contact with the obstacle due to travelling on the post-correction travelling route 62 and occurrence of a situation in which, in order to avoid contact with the obstacle, the dump truck 100 needs to be stopped before reaching the obstacle.

(Others)

The present invention is not limited to the above-described embodiment, and various modification examples in such a range as not to depart from the gist thereof are included. For example, the present invention is not limited to what includes all the configurations explained in the above-described embodiment, and what is obtained by deleting some of the configurations is also included. Further, it is possible that part of a configuration according to a certain embodiment is added to or substituted for a configuration according to another embodiment.

In the above, the case in which the controller 30 that controls the dump truck 100 is mounted in the dump truck 100 has been described. However, the controller 30 does not need to be mounted in the dump truck 100. For example, a configuration may be adopted in which the controller 30 is installed in the control center 300 and vehicle control of the dump truck 100 is wirelessly carried out.

In the above, when the dump truck 100 is to be stopped at the loading stop position P0, the dump truck 100 is controlled in such a manner as to cause a midpoint of the rear axle to be located on the loading stop position P0. However, the dump truck 100 may be controlled based on another point other than the midpoint of the rear axle.

Further, regarding the respective configurations, functions of the respective configurations, execution processing, and so forth relating to the above-described controller 30, part or all of them may be implemented by hardware (for example, logic that carries out the respective functions may be designed by an integrated circuit). Moreover, for configurations relating to the above-described controller 30, such a program (software) that the respective functions relating to the configurations of the controller 30 are implemented through reading-out and execution of the program by a computation processing device (for example, a CPU) may be employed. Information relating to this program can be stored in a semiconductor memory (a flash memory, an SSD, and so forth), a magnetic storage device (a hard disk drive and so forth), a recording medium (a magnetic disc, an optical disc, and so forth), and so forth.

Furthermore, in the explanation of the above-described respective embodiments, as control lines and information lines, what are interpreted to be necessary for the explanation of the embodiments are illustrated. However, all control lines and all information lines relating to a product are not necessarily illustrated. It may be interpreted that almost all the configurations are mutually connected in actual products.

DESCRIPTION OF REFERENCE CHARACTERS

2: Vehicle body frame
3: Vessel (vessel)
5: Front wheel
6: Rear wheel
11: Engine
12: Alternator (electric generator)
13: Hydraulic pump
14: Hydraulic circuit
15: Vessel cylinder
16: Steering cylinder
17: Electrically driven steering motor
18: Inverter
19: Electrically driven travelling motor
21: Obstacle sensor
30: Controller (controller)
31: Corrected route generating section
32: Rear-side obstacle determining section
33: Travelling control section
41: Steering control section
42: Velocity control section
50: Front work device
51: Boom
52: Arm
53: Bucket 54: Upper swing structure
55: Lower track structure
56: Movement plane
61: Pre-correction travelling route
62: Post-correction travelling route
81: Steering angle sensor
82: Velocity sensor
83: Wireless device
84: GNSS receiver
100: Autonomous travelling dump truck
200: Excavator
300: Server

The invention claimed is:

1. A control system of a dump truck of an autonomous travelling type, the system, comprising:
a controller that outputs a control signal to the dump truck to control the dump truck in such a manner that the dump truck travels on a travelling route and stops at a loading specified position, on a basis of data of the travelling route and position data of the dump truck, the traveling route including, as an end point of the travelling route, the loading specified position specified as a position at which a loading machine loads a vessel of the dump truck with a load,
wherein a work device of the loading machine has a boom, an arm, and an attachment,
wherein a movement plane of the work device is a plane in which all the boom, the arm, and the attachment move, and pass through a center in a width direction of the work device,
wherein the controller is configured to:
compute a first stop direction on a basis of the data of the travelling route before the dump truck reaches the loading specified position, the first stop direction being a front-rear direction of the dump truck in a case in which the dump truck has travelled on the travelling route and stopped at the loading specified position,
compute the movement plane of the work device when the loading machine loads the dump truck with a load at the loading specified position, on a basis of the position data of the loading machine and the loading specified position, and
correct the travelling route to compute a post-correction travelling route before the dump truck reaches the loading specified position in such a manner that a second stop direction that is the front-rear direction of the dump truck when the dump truck moves rearward on the post-correction travelling route and stops at the loading specified position coincides with the movement plane of the work device, on a basis of an angle formed by the movement plane of the work device and the first stop direction and an inter-rear-wheel distance that is a distance between a first rear wheel and a second rear wheel located on left and right of the dump truck.

2. The control system of a dump truck according to claim 1,
wherein the position data of the loading machine is position data of a swing center of the loading machine.

3. The control system of a dump truck according to claim 1,
wherein the controller is configured to:
compute, when the angle formed by the first stop direction and the movement plane of the work device is other than zero, a first distance that is a distance in the first stop direction between a first position that is a position of the first rear wheel obtained in a case in which the dump truck has travelled on the travelling route and stopped at the loading specified position and a second position that is distant from the first position and a position of the first rear wheel obtained in a case in which the dump truck has travelled on the post-correction travelling route and stopped at the loading specified position, on a basis of the inter-rear-wheel distance and the angle formed by the first stop direction and the movement plane of the work device,
compute a second distance that is a distance in a direction orthogonal to the first stop direction between the first position and the second position on the basis of the inter-rear-wheel distance and the angle formed by the first stop direction and the movement plane of the work device,
compute a first point separate from the loading specified position by the first distance on the travelling route, a second point further separate from the first point by a predetermined distance on the travelling route, and a third point further separate from the second point by a predetermined distance on the travelling route, and
translate the travelling route between the first point and the second point in the direction orthogonal to the first stop direction by the second distance and compute, as the post-correction travelling route, a route obtained by connecting the translated route to the third point and the loading specified position.

4. The control system of a dump truck according to claim 1, further comprising:
an obstacle sensor that senses an obstacle existing in an advancing direction of the dump truck,
wherein the controller is configured to:
determine, on a basis of a distance between the post-correction travelling route and an obstacle sensed by the obstacle sensor during travelling of the dump truck on the pre-correction travelling route, whether the dump truck is to get contact with the obstacle sensed by the obstacle sensor if it travels on the post-correction travelling route, and
output, when it is determined that the dump truck is to get contact with the obstacle sensed by the obstacle sensor, the control signal to control the dump truck in such a manner that the dump truck travels on the travelling route.

5. The control system of a dump truck according to claim 1, further comprising:
an obstacle sensor that senses an obstacle existing in an advancing direction of the dump truck,
wherein the controller is configured to:
determine, on a basis of a distance between the post-correction travelling route and an obstacle sensed by the obstacle sensor during travelling of the dump truck on the post-correction travelling route, whether the dump truck is to get contact with the obstacle sensed by the obstacle sensor, during travelling of the dump truck on the post-correction travelling route, and
output, when it is determined that the dump truck is to get contact with the obstacle sensed by the obstacle sensor, the control signal to control the dump truck in such a manner that the dump truck travels on the travelling route.

* * * * *